United States Patent
Haley et al.

(10) Patent No.: US 6,855,048 B2
(45) Date of Patent: Feb. 15, 2005

(54) WING TIP FEATHER PULLER

(75) Inventors: Brandon C. Haley, Springdale, AR (US); Bobby Z. Haley, Fayetteville, AR (US); Marshall Vanderpool, Bentonville, AR (US); William David Royall, Hays, NC (US); Kelvin D. Lasse, Springdale, AR (US); James Allen Ruff, Springdale, AR (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 10/249,251

(22) Filed: Mar. 26, 2003

(65) Prior Publication Data

US 2004/0192182 A1 Sep. 30, 2004

(51) Int. Cl.⁷ .............................................. A22C 21/02
(52) U.S. Cl. .............................. 452/83; 452/71; 452/82
(58) Field of Search ................................ 452/71, 82–92

(56) References Cited

U.S. PATENT DOCUMENTS

| | | | | |
|---|---|---|---|---|
| 1,218,174 A | * | 3/1917 | Faint | 452/85 |
| 1,231,401 A | * | 6/1917 | Macpherson | 452/82 |
| 1,233,904 A | * | 7/1917 | Patton | 452/85 |
| 1,372,595 A | * | 3/1921 | Bouda | 452/83 |
| 1,737,225 A | * | 11/1929 | Dunner | 452/85 |
| 1,809,891 A | * | 6/1931 | Dunner | 452/85 |
| 2,027,729 A | * | 1/1936 | Hinchliffe | 452/85 |
| 2,112,230 A | * | 3/1938 | Chester | 452/85 |
| 2,313,770 A | * | 3/1943 | Ringrose | 452/85 |
| 2,541,647 A | * | 2/1951 | Walter | 452/85 |
| 3,911,530 A | * | 10/1975 | Kalfsbeek et al. | 452/83 |
| 4,175,302 A | | 11/1979 | Scheier et al. | |
| 4,217,678 A | | 8/1980 | Crawford et al. | |
| 4,292,709 A | | 10/1981 | van Mil | |
| 4,329,760 A | | 5/1982 | van Mil | |
| 4,512,072 A | | 4/1985 | Graham | |
| 4,514,879 A | | 5/1985 | Hazenbroek | |
| 4,811,458 A | | 3/1989 | v.d. Nieuwelaar et al. | |
| 4,896,399 A | * | 1/1990 | Hazenbroek | 452/157 |
| 4,961,248 A | | 10/1990 | Criscione, II et al. | |
| 5,106,333 A | | 4/1992 | Van Dorn et al. | |
| 5,944,595 A | | 8/1999 | Prothro | |

FOREIGN PATENT DOCUMENTS

| | | | |
|---|---|---|---|
| FR | 2704728 | * | 11/1994 |
| GB | 2225924 | * | 6/1990 |
| WO | WO 94/28731 | * | 12/1994 |

* cited by examiner

Primary Examiner—Peter M. Poon
Assistant Examiner—David J Parsley
(74) Attorney, Agent, or Firm—Blackwell Sanders peper Martin LLP; Mark E. Stallion

(57) ABSTRACT

The invention is a method and apparatus for removing feathers from a carcass, and more specifically is a method and apparatus for removing feathers from the wing tips of poultry. The method and apparatus comprises at least one wing tip puller which further comprises upper and lower wing guides and a pinch roller adjacent said wing guides where the upper and lower wing guides are designed to receive a wing therebetween and the wing guide is further designed to laterally present the wing tip to the pinch roller.

5 Claims, 11 Drawing Sheets

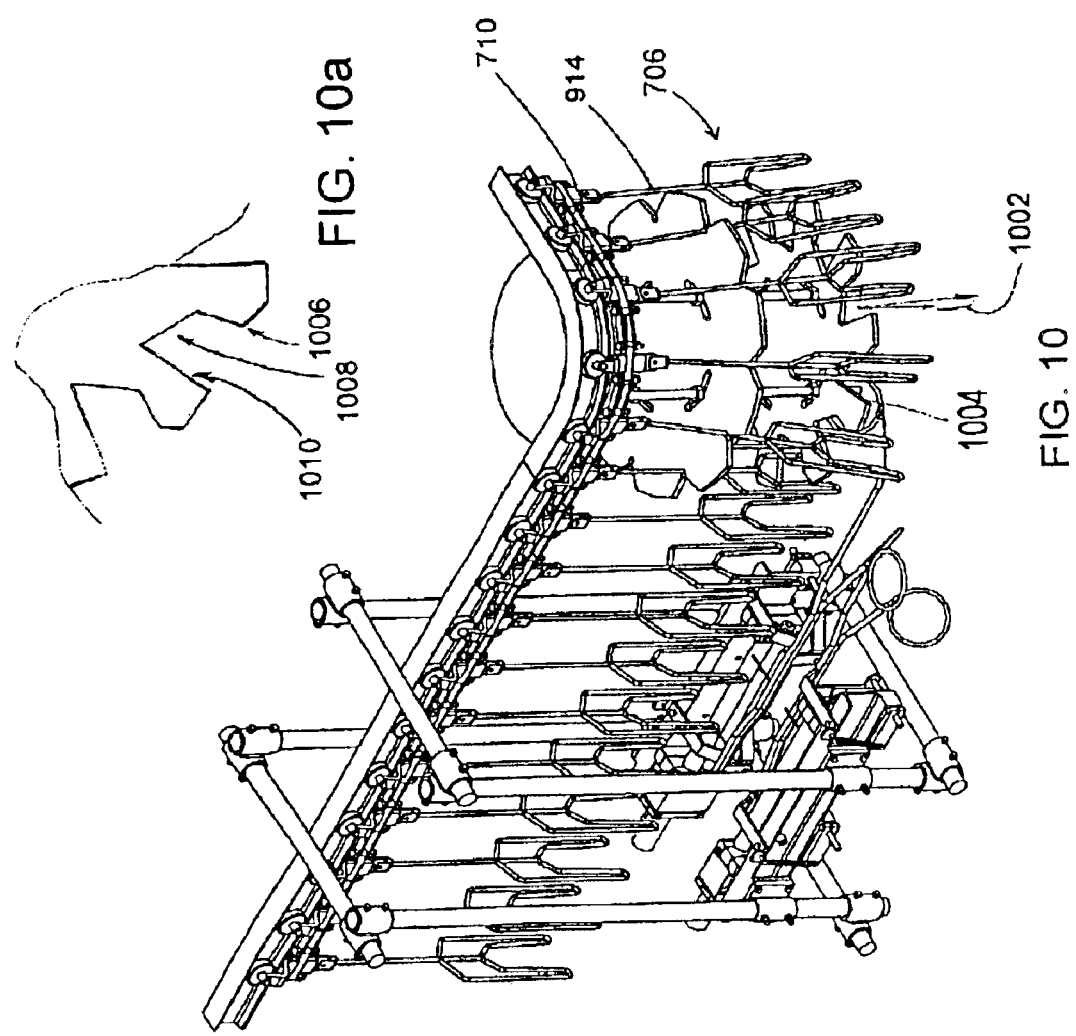

WING TIP FEATHER PULLER

BACKGROUND OF INVENTION

1. Field of Invention

This invention relates generally to removing feathers remaining on a carcass after initial feather removal and, more particularly, to removing feathers from the wing tip of a poultry carcass.

2. Background Art

Feathers left on birds are a big customer complaint in the poultry industry. Feathers are hard to remove from the wing tip, tail, and shoulder/neck area. A method and apparatus for removing feathers that can be used to satisfy the customer is needed. An aggressive method and apparatus is needed when removing wing feathers, which does not result in broken wings. The poultry industry can not produce enough wings to meet customer demand that will meet customer criteria. An invention is needed that will increase A-grade (highest quality) wing harvest.

Existing feather machines are called 'pickers'. Pickers have been used in poultry processing for several years. Pickers literally beat the feathers off with rubber cones shaped like fingers. However, these devices are not very effective in removing tail or wing tip feathers. Also, usually only one bird carcass is able to be presented to the machine at a time. Some mechanical devices have been developed which are not very effective that use smooth rollers or that has rollers that look like an auger or helical gear. Many of these devices are overly aggressive and damage the carcass by pulling the carcass into the rollers. Also, many of these devices are not designed to consistently and reliably present a wing tip or tail to the rollers creating a pinch point. A better feather puller apparatus is needed particularly for removing feathers that remain on wing tips.

SUMMARY OF INVENTION

The invention is a method and apparatus for removing feathers from a carcass, and more specifically is a method and apparatus for removing feathers from the wing tips of poultry. The method and apparatus comprises at least one wing tip puller which further comprises upper and lower wing guides and a pinch roller adjacent said wing guides where the upper and lower wing guides are designed to receive a wing therebetween and the wing guide is further designed to laterally present the wing tip to the pinch roller multiple times with varying orientations each time.

This mechanism is used to remove feathers on the wing of poultry, specifically the wing tip; however, this mechanism can be used to remove feathers from other areas of the bird such as for example, quill or tail feathers, whole wing, back, etc.

Typically, the carcass will be rotated about approximately 90 degrees while hanging in the poultry shackle. Most facilities have two main shackle poultry conveyor lines: kill and evisceration. For the typical poultry conveyor line, the birds will typically be rotated about approximately 90 degrees to present the wings to the wing tip feather puller machine. Rotation of the carcass could vary depending on how the carcass is oriented as it approaches the apparatus as it is being conveyed down the conveyor line. The carcass of the bird is preferably rotated such that the wings are oriented to be captured by the upper and lower wing guides. The wing is preferably inserted between the upper and lower wing guides in a lateral fashion such that the wing tip is presented to a pinch roller mounted adjacent the wing guides along the poultry conveyor line and sufficiently aggressive. Thus, the preferred orientation of the carcass is such that the wings are extending laterally outward on either side of the carcass with respect to the direction of conveyance.

The mechanism uses a pinch roller having two counter rotatingly driven roller elements and two guide bars per wing. The two roller elements are sufficiently close to one another to grip and pull feathers laterally presented to the rollers. The mechanism uses two guide bars which are preferably elongated guide rods to capture the wing and present the wing to the roller elements. The guide bars effect the performance of the machine. The guide bars have been designed to preferably reposition the wings four different times as they pass in front of the rollers. The wing guides preferably are formed with multiple lateral bents with respect to the pinch roller which create segments in the wing guides having varying lateral angles with respect to the pinch roller. Each segment therefore presents the wing tip with a different orientation with respect to the pinch roller. The rollers are used to create a nip point or pinch point that pulls the feathers out of the wing.

The present invention is a method and apparatus for removing feathers remaining on wing tips of a poultry carcass after the feather removal process has been performed and the carcass is being conveyed in shackles through the poultry conveyor line. The invention captures each wing between an upper and lower guide bar or guide rod which captures the wing by scissoring or pinching the wing within an expandable gap between the upper and lower guide bars. Preferably the wing is captured between elongated guide rods which have a generally upper and lower orientation, however the guide rods could have a generally side by side orientation with the pinch roller positioned above or below. The guide rods capture and position the wing in such a manner to present the wing tip to a pair of roller elements as the wing is being conveyed or translated slidably through the expandable gap between the guide rods. The guide rods are formed to vary the position and orientation of the wing in various ways as it is being conveyed by the pinch roller in order to assure that any feathers remaining on the wing tip are captured and pulled by the pinch roller thereby pulling the feather from the wing tip. A wing tip pulling apparatus having guide bars or guide rods and pinch roller can be positioned on either side of the path of conveyance as the carcasses are being conveyed in the shackles along the evisceration or the kill line. By placing a feather pulling apparatus on either side of the path of conveyance, removing feathers from the left and right wing tip can be performed concurrently.

These and other advantageous features of the present invention will be in part apparent and in part pointed out herein below.

BRIEF DESCRIPTION OF DRAWINGS

For a better understanding of the present invention, reference may be made to the accompanying drawings.

FIG. 10 shows the hang rod of the shackle captured in a circular notch.

FIG. 10a shows the notch of the lower sprocket wheel.

DETAILED DESCRIPTION

Figure 1:
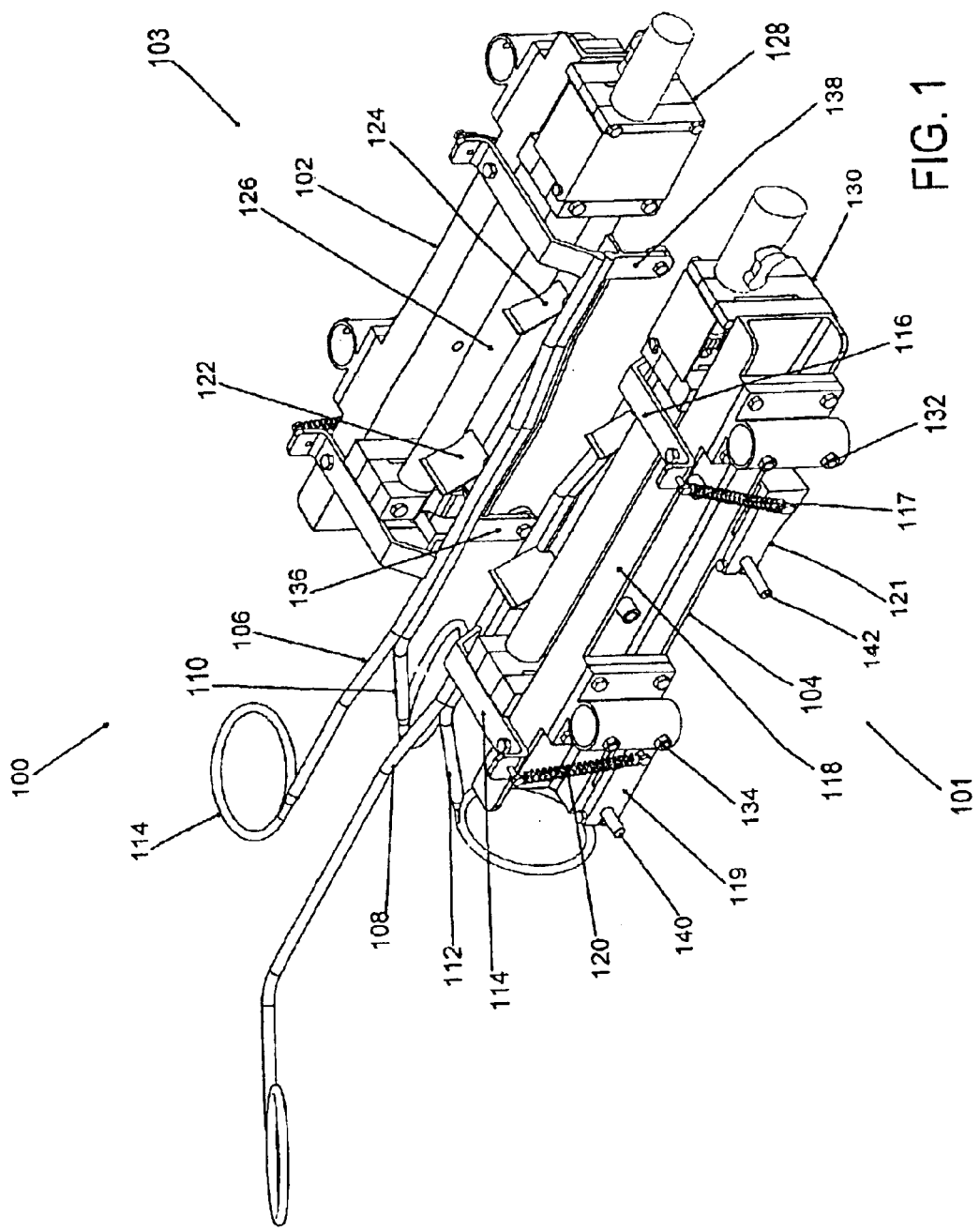
FIG. 1 is a right-rear isometric view of the left and right wing tip pullers.

According to the embodiment(s) of the present invention, various views are illustrated in FIG. 1–8 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising teaches a novel apparatus and method for removing feathers from a bird carcass, more specifically for removing feathers from the wing tip of a poultry carcass. The method and apparatus comprises at least one wing tip puller which further comprises upper and lower wing guides and a pinch roller adjacent said wing guides where the upper and lower wing guides are designed to receive a wing therebetween and the wing guide is further designed to laterally present the wing tip to the pinch roller.

The details of the invention and various embodiments can be better understood by referring to the figures of the drawing. Referring to FIG. 1, a wing tip feather pulling assembly 100 is shown which includes a left and right wing tip puller. The left and right wing tip pullers can be mounted along either side of the poultry conveyor line. However, optionally a single wing tip puller can be used at any given point on the line. The left and right wing tip pullers each comprise a frame, 118 and 102 respectively, and mounting sleeves. The mounting sleeves 132 and 134 are a means by which the wing tip feather pullers can be mounted along a poultry conveyor line and preferably to a frame for actual operation. Each of the left and right wing tip pullers 101 and 103 respectively each have a set of upper and lower wing guide bars or rods 108, 112, 106 and 110. The preferred embodiment is shown where the guide bars are elongated guide rods. Each of the guide bars has a steering loop 114 on the receiving end which assists in positioning the carcass appropriately such that the wings are received between the upper and lower guide bars. The steering loop 114 positions birds and it prevents the shackle from hanging on guide bars. The left upper and lower guide bars 108 and 112 and the right upper and lower guide bars 106 and 110 each have sections, which extend outward beyond the frames 118 and 102. The guide bars make the initial contact with the oncoming carcass that is being conveyed in the poultry line shackles. Each of the upper and lower guide bar sets are formed such that the upper and lower guide bars are angled away from one another forming a v-like pattern along the sections that extend outward beyond the frames. Along this section, the upper and lower wing guide bars are angled inward toward one another in the direction of conveyance.

The upper and lower guide bars for the remainder of their length preferably extend in a substantially parallel manner. The upper and lower guide bars extend in a substantially parallel manner as they extend adjacent the pinch rollers 126. The pinch roller has upper and lower roller elements and are driven by a motor effecting mutually opposite rotation of the roller elements. The upper and lower guide bars as they extend in a substantially parallel fashion are immediately adjacent one another when no wing has been received therebetween. The upper and lower guide bars are designed to expand outward away from one another when a wing is received therebetween. The upper and lower guide bars expand outward to receive the wing while firmly capturing and clamping the wing therebetween. The clamping action by the upper and lower guide bars is sufficiently aggressive to hold and position the wing appropriately while allowing the wing to slidably translate therebetween as the carcass is being conveyed between the two feather pullers. At least one of the upper and lower guide bars are spring-loaded to bias the upper and lower bars inward toward one another. The guide bars expand outward away from one another as the wing is received therebetween. In the preferred embodiment as shown in the Fig., the upper guide bar is attached to the feather puller frame by a bracket 114 as shown on the left feather puller 101. The bracket 114 has a pin extending therefrom whereby a spring 120 is attached on one end of the spring to the pin. The opposing end of the spring 120 is attached to one end of a torque arm 119. The opposing end of the torque arm is attached to one end of a tortional transfer shaft 140. The opposing end of the tortional transfer shaft 140 is attached to a following torque arm which is operatively attached to the underside of the lower wing guide member thereby urging upward the lower wing guide member. In the preferred embodiment of the wing tip feather puller the upper wing tip guide arm is fixed in a stationery position by mounting brackets 114 and 116. This applies for both the left and right wing tip puller. Similarly, there is a spring attached to each of the brackets 114 and 116 as shown by springs 120 and 117. The springs 120 and 117 are attached on opposing-ends by torque arms 119 and 121 respectively. The torque arms transfer a torque generated by the springs to tortional shafts 140 and 142. The tortional transfer shafts transfer the torque to torque following arms which are operatively attached to the underside of the lower wing guide as shown by elevation members 136 and 138. The elevation members 136 and 138 are attached to the underside of the lower wing guide and they are urged upward by the rotation generated by the springs.

As the wings are received between the upper and lower wing guides, the space between the upper and lower guides expand outward thereby reversibly opposing the rotational torque of the tortional transfer shafts as shown for example by items 140 and 142. The left and right wing tip pullers are simply left and right compliments of each other with the possible exception of a different bend angle of the upper and lower wing guides. The outward bend of the portion or section of the guides that extend beyond the wing tip puller frame can differ from left to right depending on how the carcass approaches the wing tip puller. The bend of the receiving end of the upper and lower arms can vary such that the wings of the carcass are received between the upper and lower guide arms.

The upper guide arm also has guide flaps attached thereto as shown by guide flaps 122 and 124. The guide flaps will urge the wing tips downward as they are conveyed between the upper and lower guide arms such that the wing tips are adequately presented to the pinch roller as shown by pinch roller 126. The urging downward by the flaps presents the wing tips to the pinch roller in a more lateral fashion assisting in creating a nip point.

Figure 2:
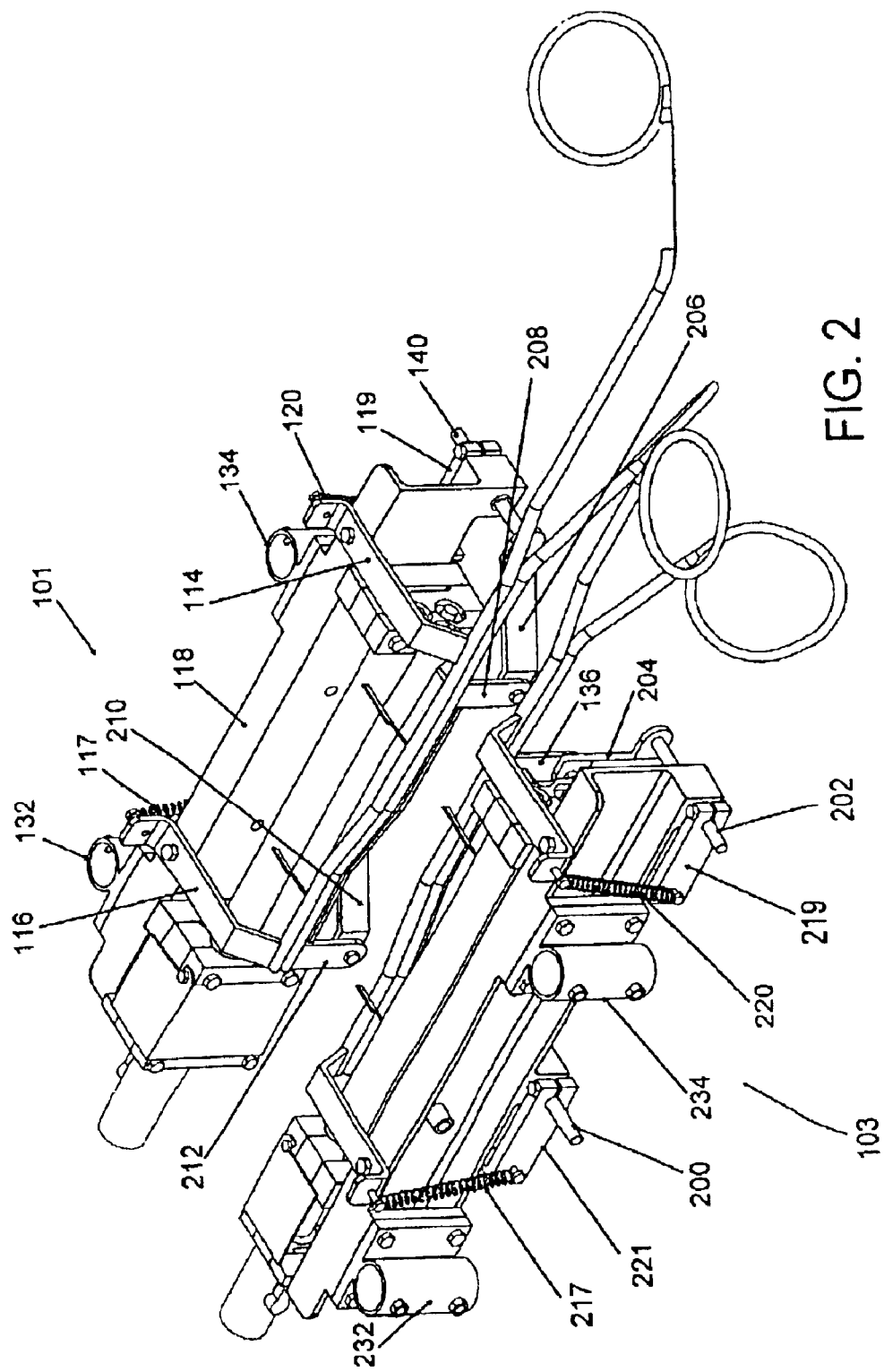
FIG. 2 is a left-front isometric view of the left and right wing tip pullers.

Referring to FIG. 2, the left and right wing tip pullers 101 and 103 respectively is shown. FIG. 2 provides a view of the following torque arms 204, 206 and 210. The fourth following torque arm for the right wing tip puller cannot be seen from this view. As described above the upper wing guide is attached to a bracket 114 which is in turn attached to frame 118. A spring member 120 extends from bracket 114 to torque arm 119 thereby applying a rotational torque to the torque arm. The torque arm 119 applies a torque to tortional transfer shaft 140 which transfer the torque to the following torque arm 206 which urges lift member 208 upward thereby urging upward the lower guide arm. The same mechanical operation is applicable to bracket 116, spring member 117 following torque arm 210 and lifter 212. The same mechanical operation also applies for spring member 120, torque arm 219, tortional transfer shaft 202, following torque arm 204 and lifter 136.

This configuration spring loads the lower guide urging the lower guide upward towards the upper guide. When a wing is received between the upper and lower guide the spring loaded lower guide expands away from the upper guide while the spring continues to urge the lower guide upward pinching the wing between the guides. Finally, the same mechanical operation applies for spring member 217, torque arm 221 and tortional transfer shaft 200. Prior to wings being received between the upper and lower guides the springs 117, 120, 217, and 220 urge the lower guide arm upward toward and against the preferably fixed upper guide arm. Therefore, the lower guide arm is allowed to float and expand downward away from the upper guide arm when a wing is received between the upper and lower guide arms. The spring loaded action of the lower guide arm pinches the wing and presents the wing to the pinch roller and holds the carcass by the wing making it difficult for the carcass to be pulled into the pinch roller. As discussed above, each of the left and right wing tip pullers have a pair of sleeve mounts 132 and 134, 232 and 234 respectively, which allow the wing tip pullers to be mounted along a poultry conveyor line.

Figure 3:
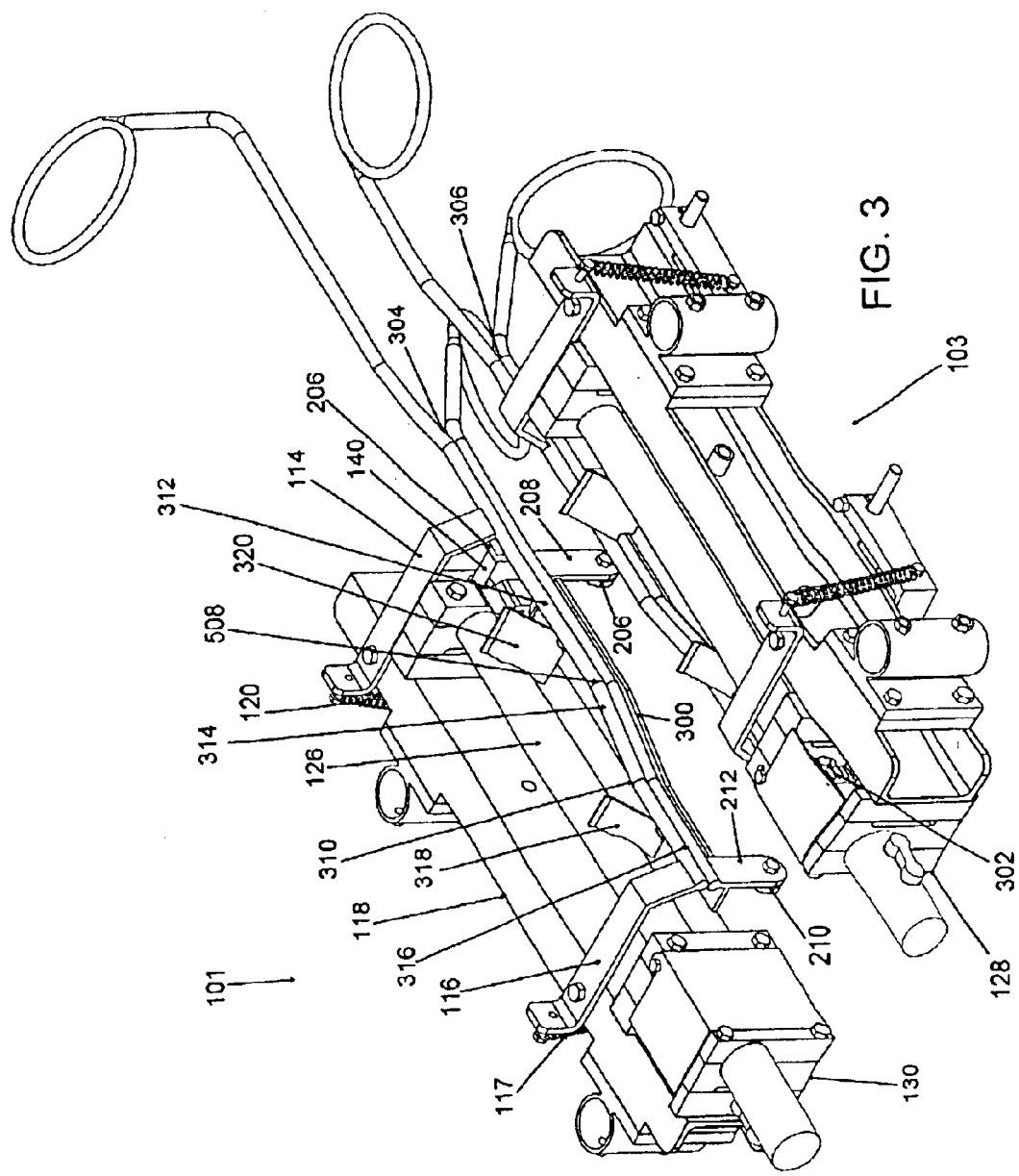
FIG. 3 is a left-rear isometric view of the left and right wing tip pullers.

Referring to FIG. 3, the left and right wing tip pullers 101 and 103 are shown. The upper and lower wing guide arms are angled inward toward one another to a point where they extend substantially in a parallel manner. The upper and lower guide arms are immediately adjacent one another forming a substantially narrow gap 304 and 306 therebetween. The gaps 304 and 306 are expanded when a wing is received therein. The lift members 212 and 208 are urged upward by following torque arms 210 and 206 which urges the lower guide arm upward thereby pinching the wing between the lower and upper guide arms. The pinching action of the lower guide is sufficient to securely hold the wing and present the wing to the pinch roller with the desired orientation. However, the pinching action is not too aggressive to prevent slidable translation of the wing between the upper and lower guides.

As the upper and lower guides extend adjacent beyond the length of the pinch rollers 126, the upper and lower guide arms have multiple angular bends, for example, coincident lateral angular bends 308 and 310 which create segments of the upper and lower guide arms for example, segments 312, 314 and 316, which vary in their angular orientation with respect to the pinch roller 126. These various segments of the upper and lower guides cause a variance in the positioning of the wing as it passes along the pinch roller 126. These segments having varying angles with respect to the pinch roller presents the wing tip to the pinch roller with various positioning to assure that the pinch roller captures any feathers which remain on the wing tip. The guide flaps 318 and 320 also urge the wing tips downward toward the pinch roller such that the wing tips are adequately presented to the pinch roller such that the remaining feathers are pulled from the wing tip.

The pinch roller for the left and right wing tip pullers are powered by drives 130 and 128 respectively. The drive is applied to the upper roller element and is transferred to the lower roller element by transfer gear 302. The drive effects mutually opposite rotation of the roller elements. The upper and lower roller elements of the pinch roller are spaced immediately adjacent one another such that the close proximity of the rollers are sufficient to grab any feathers remaining on the wing tip. The roller elements are counter rotatingly driven. The roller elements must be relatively aggressive in order to pull the remaining feathers from the wing tip. Achieving a relatively aggressive roller can be accomplished by varying the texture of the rollers, varying the speed and closeness of the rollers with each other and other parameters. The wings are allowed to slidably translate between the guides, however, the guides have a sufficient grasp to the wings as the wings are slidably translated between the upper and lower guide arms such that the pinch roller does not pull the wing into the roller causing broken wing bones or tear the skin covering the wing. Also having wing tip pullers mounted on either side of the carcass as it is conveyed thereby on the poultry line, which sufficiently grasp the carcass by the opposing wing such that the carcass is not pulled laterally into either of the pinch rollers.

Figure 4:
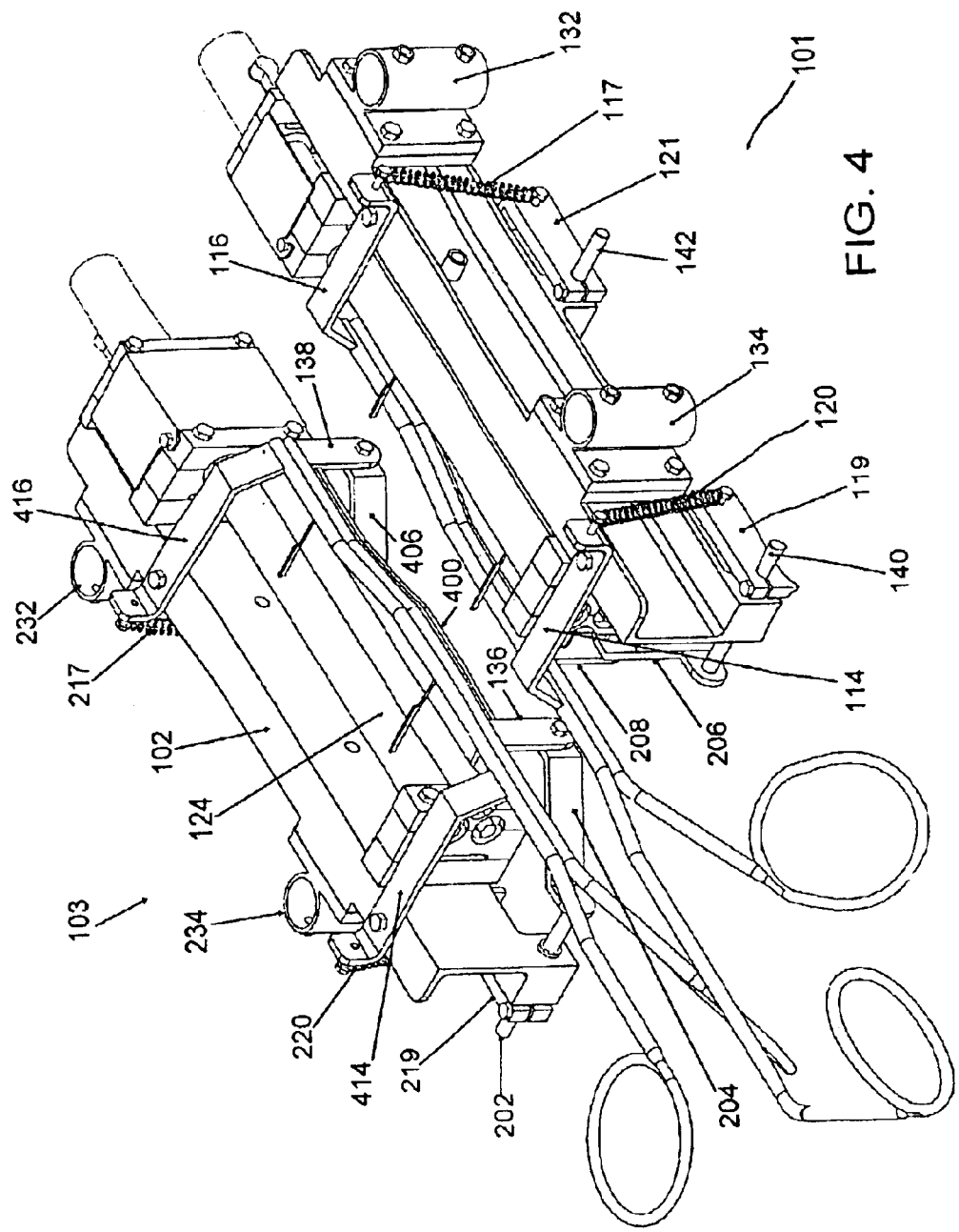
FIG. 4 is a right-front isometric view of the left and right wing tip pullers.

Referring to FIG. 4, the left and right wing tip pullers 101 and 103 are shown. The right wing tip puller 103 is shown with brackets 414 and 416 which attach the upper guide arm of the right wing tip puller to the frame 102. These brackets 414 and 416 fix the position of the upper guide arm. However, the upper and lower guide arms could be designed such that both the upper and lower guide arms are spring loaded or are allowed to float. However, in this preferred embodiment the upper guide arm is fixed by brackets 414 and 416 to the frame 102. And as described above the brackets 414 and 416 have springs 217 and 220 extending therefrom. The rear following torque arm 406 is shown in this view which was not seen in FIGS. 1, 2 and 3. Again, the following torque arm 406 urges the lift member 138 upward and thereby urging the lower guide arm upward and against the upper guide arm. Also shown in this view is a wing tip hold down member 400 between lift member 136 and 138 to urge the wing tip downward and into the rollers.

Figure 5:
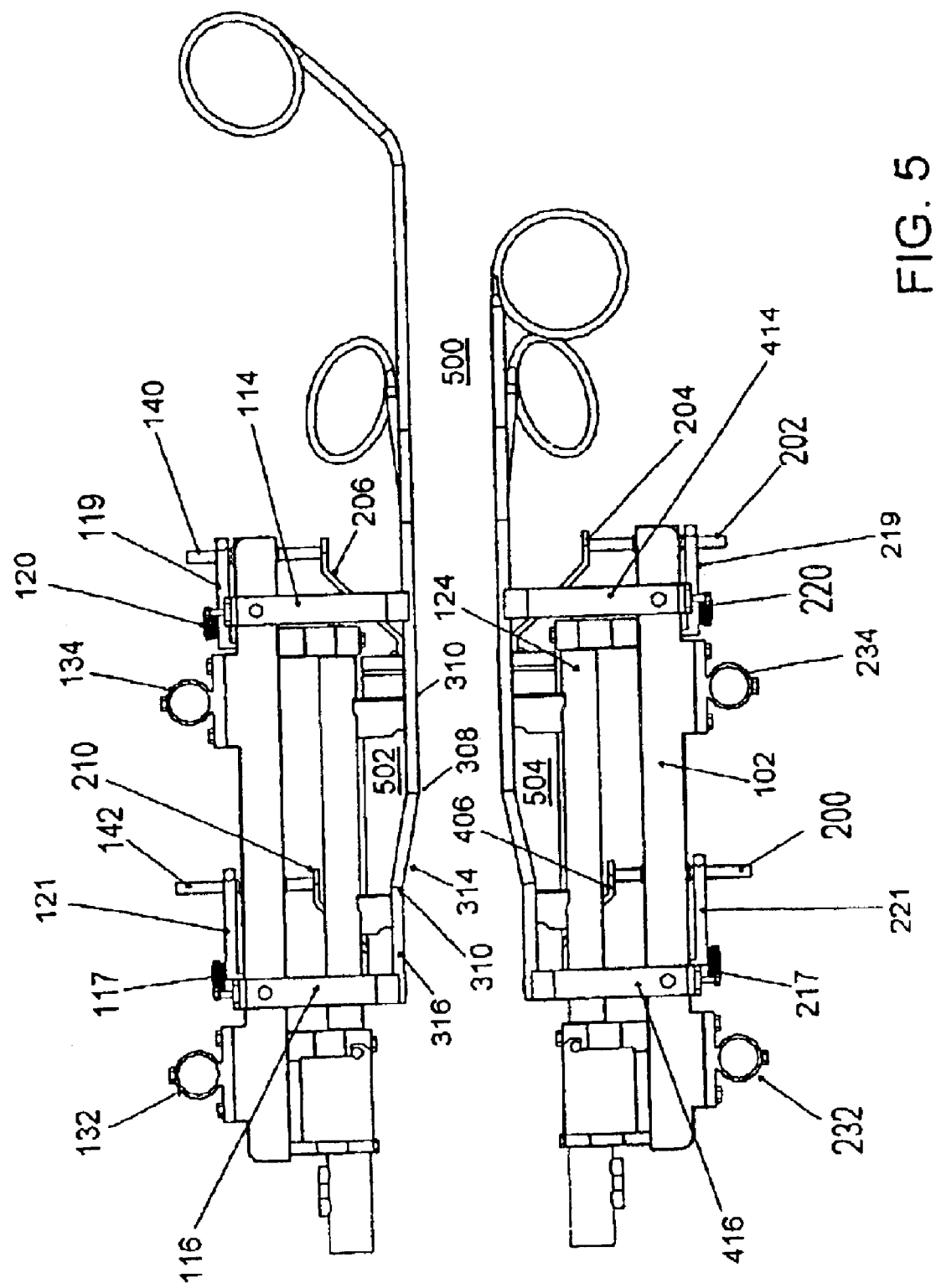
FIG. 5 is a top plane view of the left and right wing tip pullers.

Referring to FIG. 5, a top plane view of the left and right wing tip pullers are shown. The top plane view reveals the gap 500 between the left and right wing tip pullers. The carcass is conveyed along the gap 500 between the two wing tip pullers with the opposing wings pinched between the left and right guide arm pairs. The top plane view also reveals the spacing 502 and 504 between the guide arms and the pinch rollers. The angular bends 308 and 310 are also revealed. The angular bends 308 and 310 create the segments of the guide arms 310, 314 and 316 which vary their angular orientation with respect to the pinch roller thereby varying the spacing 502 and 504 between the guide arms and the pinch roller. These segments 310, 314 and 316 which vary their spacing and angular orientation with respect to the pinch roller varies the position and orientation of the wing tip such that the wing tip is presented to the pinch rollers at various positions with varying orientation to assure that nip point is created such that the remaining feathers are removed from the wing tip.

Figure 6:
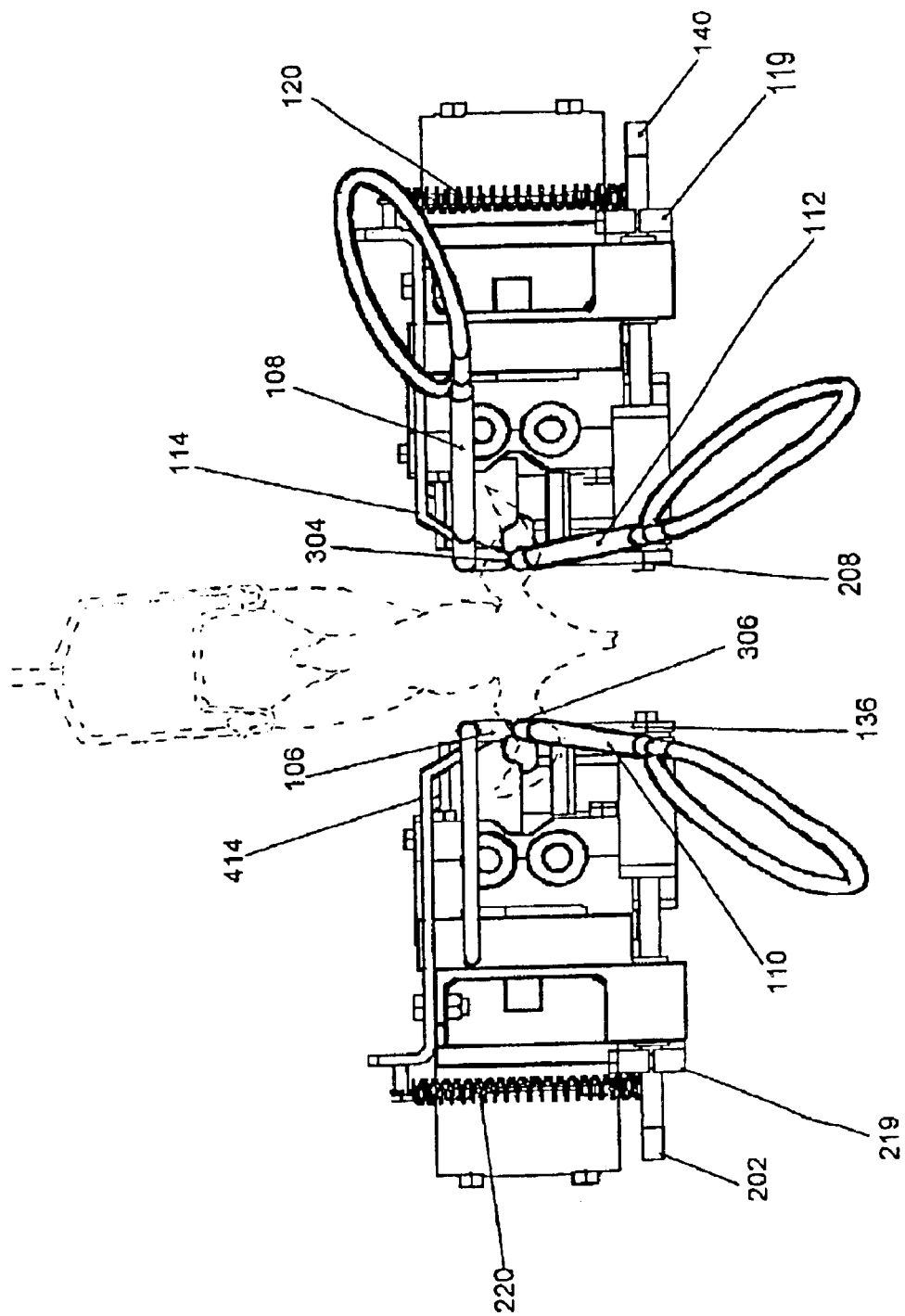
FIG. 6 is a front (entry) view of the left and right wing tip pullers.

Referring to FIG. 6, a front entry view of the left and right wing tip pullers are shown. The left and right upper wing guides 108 and 106 are shown and the left and right lower wing guides 112 and 110 are shown. The left and right upper wing guides are mounted to their respective frames by brackets 114 and 414. The left and right lower wing guide members 112 and 110 are urged upward by lift members 136 and 208. As discussed above springs 120 and 220 create a torque on torque arms 119 and 219 respectively which creates a torque on tortional shafts 140 and 202 respectively. The tortional shaft in combination with following torque arms cause lift members 136 and 208 to urge the lower left and right wing guides 112 and 110 respectively upward such that the gaps 304 and 306 are substantially eliminated when no wing is passing between the upper and lower wing guides.

Figure 7:
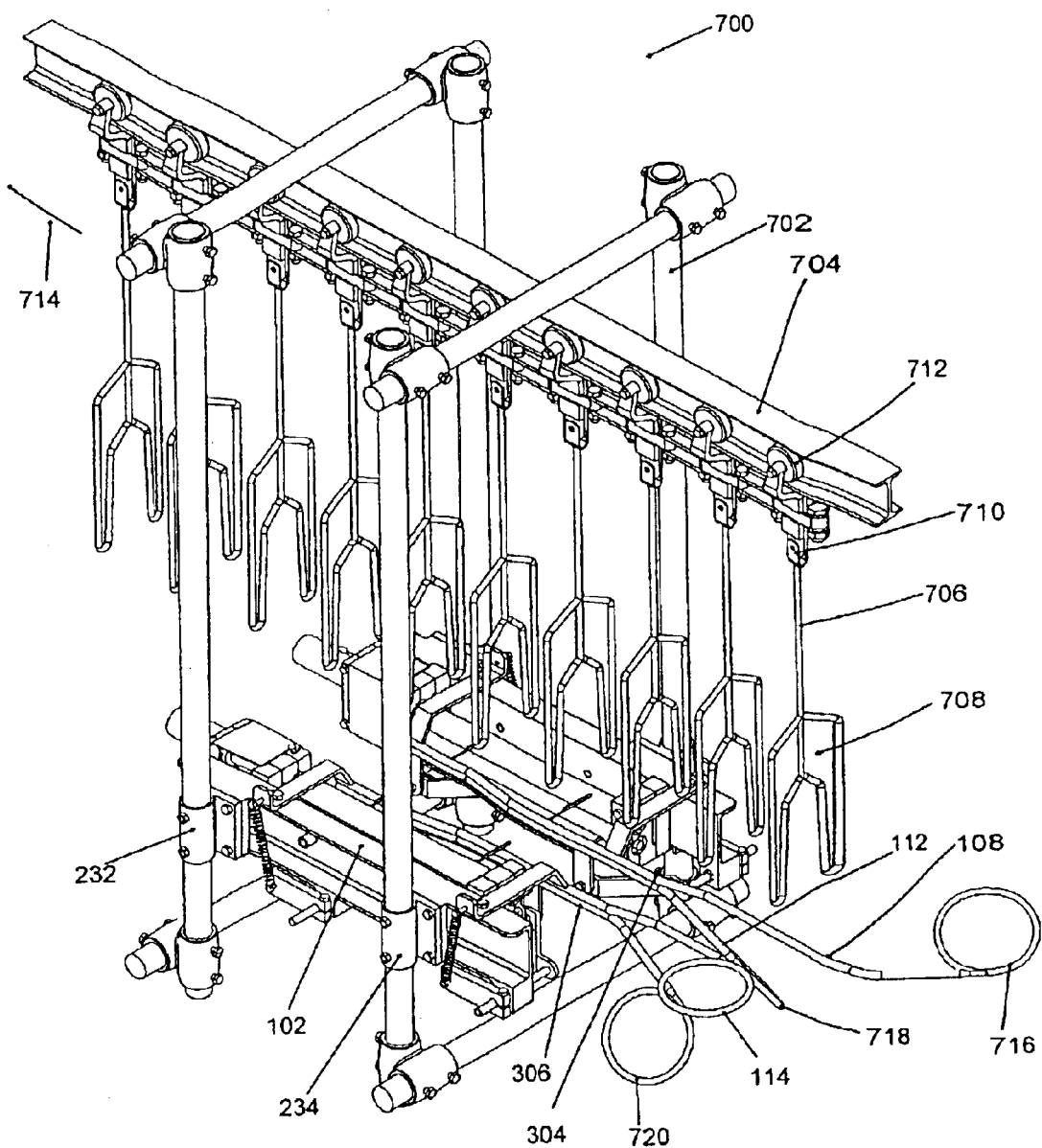
FIG. 7 is a left-front view of the conveyance line with the left and right wing tip pullers installed.

Referring to FIG. 7, a conveyor line 700 is shown. The conveyor line 700 comprises a frame structure 702 to which the various components are mounted. An overhead conveyor rail 704 extends along the line for conveying a plurality of poultry shackles 706 which hang the carcasses as they are conveyed along the line. The shackles 706 are attached to a track roller assembly 712 by a pivoting member 710 which allows the shackle and the carcass hanging therein to freely hang and rotate in a multi-directional manner around the pivotal member 710. The shackle 706 has a pair of adjacent shackle openings 708 in which the legs of the carcass are hung. The shackles are conveyed along the overhead conveyor rail 704 along a path of conveyance as indicated by arrow 714. The shackles and the conveyor convey carcasses hanging therefrom between the left and right wing tip pullers. The left and right wing tip pullers are mounted to the poultry conveyor line frame 702 by sleeve mounts along the conveyor line as for example sleeve mounts 232 and 234. The sleeve mounts 232 and 234 are attached to the frame 102 of the wing tip puller. The left and right wing tip pullers are positioned on either side of the path of conveyance along the conveyor line and mounted to the frame 702 at a height to receive the wings between the upper and lower wing guides. The carcass is hung in the adjacent openings of the shackle by the hock joint such that the carcass is hanging with the head downward. The carcass is positioned such that the wings extend laterally outward on either side of the path of conveyance such that they are received between the upper and lower wing guides. As the carcass approaches the left and right wing tip pullers the circular guide members 720, 114, 718 and 716 position the carcass and specifically the wings such that they are received between the upper and lower wing guides and prevents the shackle from hanging up on the guide bars. This positioning of the carcass can be a 90° rotation as assisted by a pair of sprocket wheel members each having a specially designed tooth pattern about their respective circumference.

Figure 9:
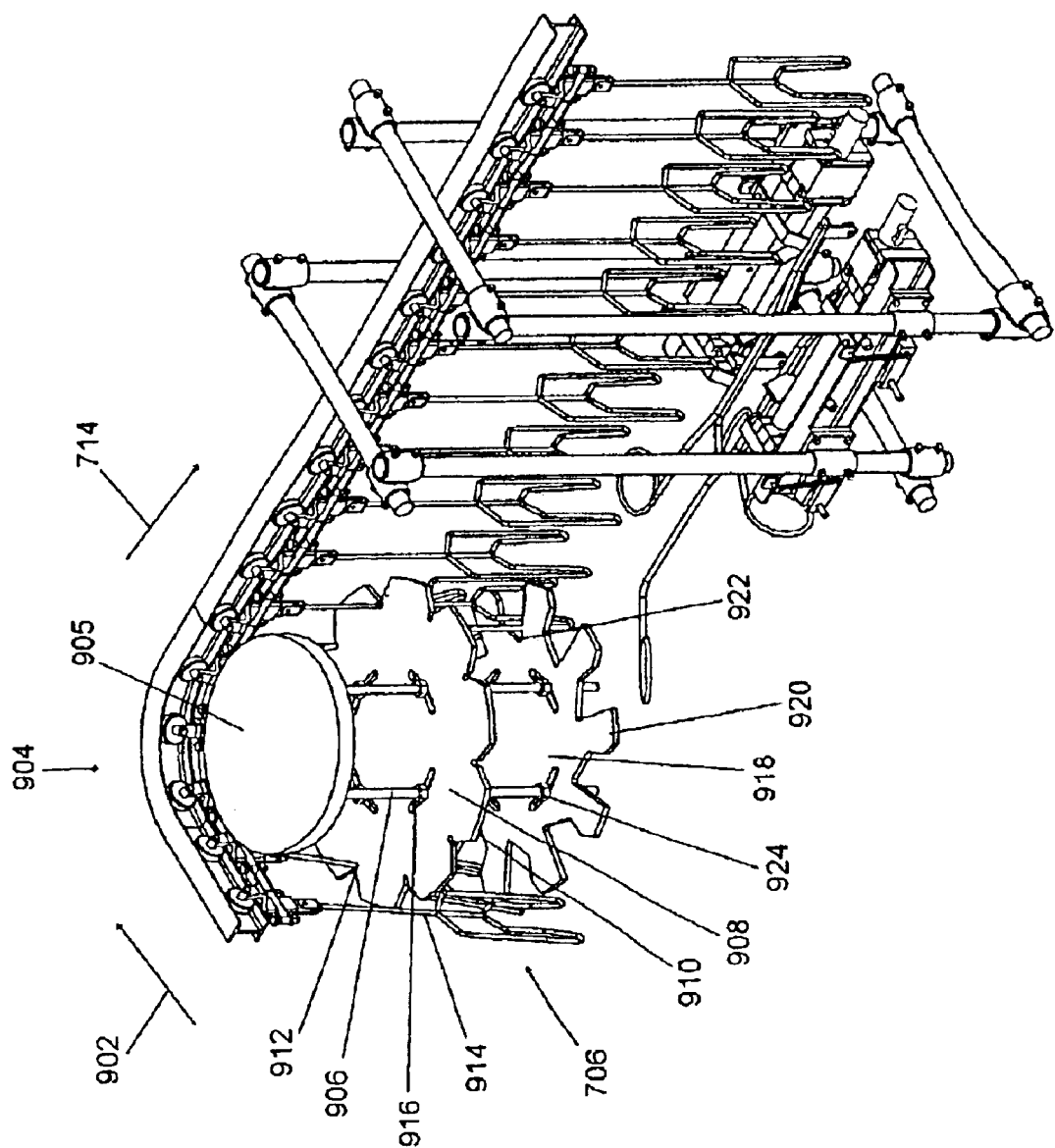
FIG. 9 shows the path of conveyance just prior to and leading to the wing tip puller assembly.

Referring to FIG. 9, the path of conveyance 714 just prior to and leading to the wing tip puller assembly is shown oriented with a substantially 90° angle to conveyance path 902 which is subsequent the kill line. The plurality of shackles 706 being conveyed along the conveyance path 902 are oriented such that the carcasses hanging therefrom have their wings aligned substantially along the path of conveyance 902 and with the breast and back portions of the carcass oriented along a direction substantially perpendicular to the path of conveyance 902. This orientation is inappropriate for engaging the wing tip pulling assembly as it shown in FIGS. 9 and 10. Therefore, the shackles and the carcasses therefrom must be reoriented such that the carcasses engage the wing tip pulling assembly in a face up manner. The dual sprocket wheel assembly 904 reorients the shackles 706 and the carcass hanging therefrom such that the carcass appropriately engages the wing tip pulling assembly.

The dual sprocket wheel assembly 904 has an upper and lower sprocket wheels 908 and 918 respectively. The upper and lower sprocket wheels 908 and 918 are suspended from and connected to a shackle line carrier sprocket wheel by a plurality of suspension bars 906. The slots allow the upper and lower wheels to be horizontally rotationally adjusted with respect to one another. The upper and lower sprocket wheels have a plurality of slots for receiving there through the plurality of suspension bars 906. The upper and lower sprocket wheels are fixedly spaced and mounted along the suspension bars by a plurality of mounting members 924. The upper sprocket 908 has a specially designed tooth pattern 910 around the circumference of the upper sprocket wheel. Each tooth 910 of the tooth pattern about the circumference is separated by a circular notch 912 or crevice for receiving the hang rod 914 or shank of the shackle 706. The lower sprocket wheel 918 also has a tooth pattern 920 about its circumference. Each tooth in the tooth pattern is separated by a specially shaped notch 922 for receiving the lower portion of the shackle therein. The plurality of slots 916 in the upper and lower sprocket wheels through which the suspension rods 906 extend allow the upper and lower sprocket wheels to be rotatably adjusted with respect to one another.

As the shackle is being conveyed along conveyance path 902 the outer diameter of the lower wheel (a tooth) contacts the leading edge of an oncoming shackle which starts rotation of shackle; and then the bottom hook end of the shackle is received in one of the notches between the teeth of the lower sprocket wheel and the hang rod of the shackle is received in the circular notch of the upper sprocket wheel to establish a pivot point. The diameter of the upper sprocket wheel is large enough such that the plurality of circular notches of the upper sprocket wheel are extended laterally outward beyond the vertical hang line of the shackles hang rod (centerline of conveyor chain). This causes the shackle to pivot outward about the pivotal member 710. Please refer to FIG. 10 which shows the hang rod 914 of the shackle 706 captured in the circular notch 912 thereby causing the shackle to pivot outward at a cant about pivotal member 710 such that the shackle cants outward from vertical at an angle 1002.

Figure 10B:
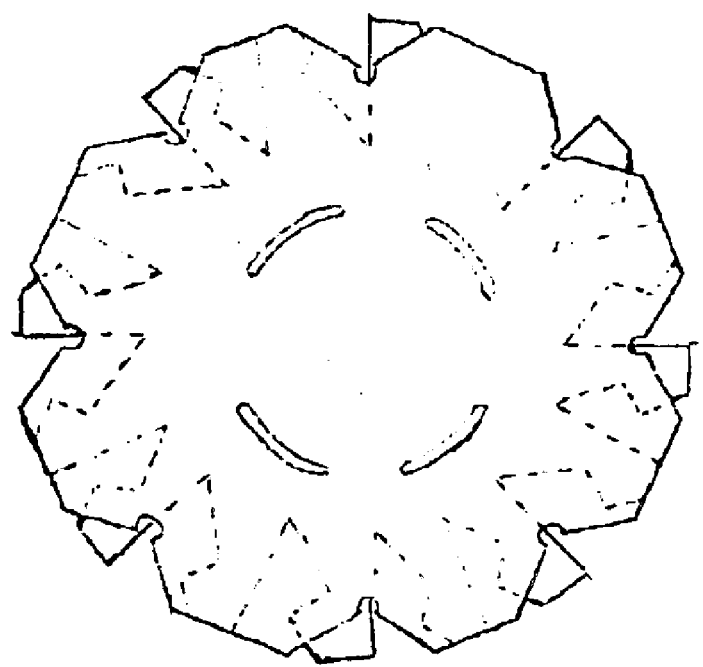
FIG. 10b shows the upper sprocket wheel 908 superimposed over the lower sprocket wheel.

As the shackle travels around the sprocket wheels, the shackle will have a tendency to pivotally rotate in the circular notch of the upper sprocket wheel until the shackle stops against the flat side 1004 of the specially shaped notch 922 of the lower sprocket wheel. Referring to FIG. 10a the notch of the lower sprocket wheel is shown in detail. Gravity takes over due to the heavy breast of the carcass causing the carcass breast and hence the shackle to rotate 90 degrees stopping against the flat side of the notch. FIG. 10b shows the upper sprocket wheel 908 superimposed over the lower sprocket wheel 918. The outline of the lower sprocket wheel is partially shown with solid and hidden lines. The number of teeth of the upper and lower sprocket wheel may vary depending on various parameters such as the spacing between the oncoming shackles of the conveyor. The alignment of the teeth and notches of the upper sprocket wheel with those of the lower sprocket wheel may also vary as the sprocket wheels can be horizontally rotatably adjusted using slots 916. The number of teeth of the upper and lower wheels and their alignment may vary, depending on how the shackles are to be turned. The notch of the lower sprocket wheel has a hook portion 1006 for capturing the lower portion of the shackle and an inwardly slanted backside which allows the shackle to slide inwardly along the backside repositioning itself as it pivots in the circular notch of the upper sprocket wheel. Pushing the leading edge of the shackle makes the shackle and carcass hanging therein rotate in the desired direction. The specially shaped notch of the lower sprocket wheel also has a flat side 1010 which stops the rotation of the shackle and squares its positioning such that the carcass hanging in the shackle approaches the wing tip pulling assembly in a face up manner.

The upper and lower sprocket wheels are connected together by four (4) vertical suspension bars or rods and the rods also connect the two wheels to a third wheel which is the shackle line corner sprocket/wheel. The shackle line corner sprocket/wheel is connected to the shackle line chain. Therefore, rotation of the upper and lower wheels are effected by the shackle line chain. The upper and lower wheels can travel at the same rate as the corner sprocket and the line speed. However, depending on the application the corner sprocket could be geared such that the upper and lower wheels do not turn at the same rate as the line speed.

During operation when the shackles travel around the wheels the heavier and widened lower shackle portion, with the carcass hanging therefrom, is canted outward and a pivot point is established on the upper suspension rod portion of the shackle where it rests in a notch of the upper sprocket wheel. The weight of the carcass, the conveyance of the shackle, and gravity causes the shackle to rotate about the established pivot point. Rotation is stopped by the substantially flattened side of the notch in the lower sprocket wheel.

The carcass is positioned such that the carcass is conveyed along the path of conveyance between the left and right wing tip pullers in a face up manner (the breast facing in the direction of conveyance and the tail facing rearward with each wing extending laterally outward perpendicular to the path of conveyance). The wings are received within the gaps 304 and 306 and are pinched between the upper and lower wing guides. As the wings are pushed into and through gaps 304 and 306 the lower wing guides are expanded downward such that the gaps 304 and 306 expand such that the wings are pinched between the upper and lower wing guides. A section of the upper wing guide 108 and the lower wing guide 112 angle away from one another as they extend beyond the frame of the wing tip pullers. The angles at which they separate can vary depending on the specific conveyor line such that the wing is appropriately positioned to be received in the gap between the upper and lower wing guide. The ring members 716 and 718 positioned at the end of the wing guide can be oriented in such a manner to position the carcass and the wing such that the wing can be appropriately received in the gap between the upper and lower wing guides.

Figure 8:
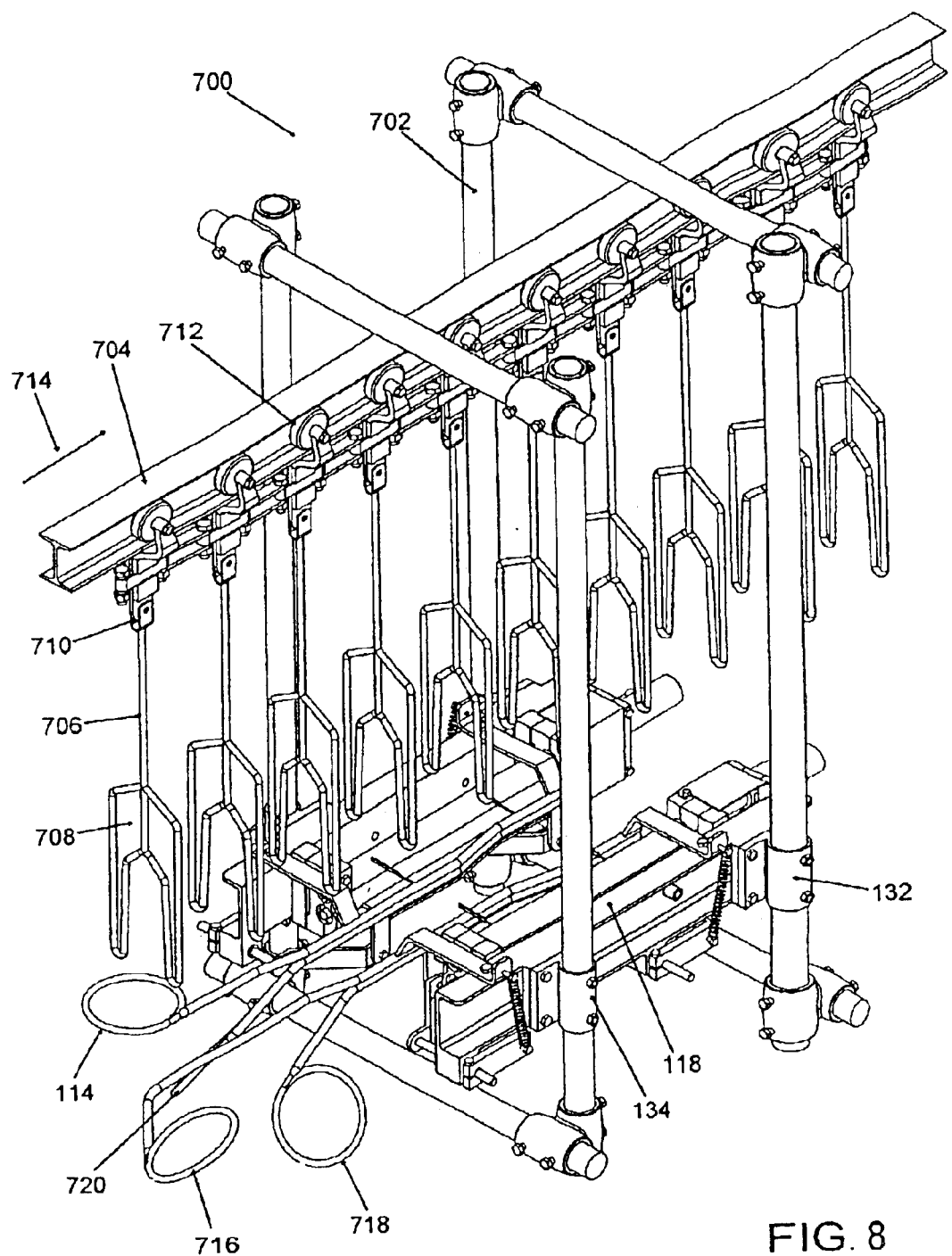
FIG. 8 is a right-front view of the conveyance line with the left and right wing tip pullers installed.

Referring to FIG. 8, the poultry conveyor line is shown. The receiving end of the wing guides are shown where each receiving end has circular guide members 114, 720, 716 and 718. The left and right upper and lower guide rod pairs each have sections that extend beyond the wing tip puller frame, for example frame 118, and the sections of the left and right pairs have different bends. The bends are designed to optimally capture the wing and can vary depending on the orientation of the carcass as it approaches. The shackle 706 is conveyed along a conveyance path between the left and right wing tip pullers mounted along poultry conveyor line 700 on either side of the conveyance path to frame 702 by for example sleeve mounts 134 and 132. The shackles are hung by wheels 712 to conveyor rail 704. The direction of conveyance is indicated by arrow 714.

The various wing tip feather puller examples shown above illustrate a novel method and apparatus for removing feathers from a carcass, more specifically for removing feathers from the wing tips of a poultry carcass. A user of the present invention may choose any of the above wing tip puller embodiments, or an equivalent thereof, depending upon the desired application. In this regard, it is recognized that various forms of the subject wing tip puller method and apparatus could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

Industrial Applicability

The success of this machine was measured in a factory test environment by evaluating the Feather Reduction through use of the machine. Below is the data collected from the factory test environment.

Data:

| Test # | Feather Count Pre-Machine | Feather Count Post-Machine | Empty Shackles | Broken Drummette |
|---|---|---|---|---|
| 1 | 40 | 3 | 1 | 8 |
| 2 | 38 | 11 | 0 | 7 |
| 3 | 36 | 5 | 0 | 5 |

Results:

| Test # | Feather % Pre-Machine | Feather % Post-Machine | Feather Reduction Percentage Points | Feather Reduction % |
|---|---|---|---|---|
| 1 | 21% | 2% | 19% | 93% |
| 2 | 20% | 6% | 14% | 71% |
| 3 | 18% | 3% | 16% | 86% |
| Average: | 19.7% | 3.3% | 16.5% | 83.2% |

Empty shackles and broken drummettes were subtracted from the 200 wing total when calculating the percentages.

Broken drummette is defined as a compound fracture of the bone within the drummette.

It should be noted that the feather percent listed above is for wing count. The number shown should not be confused with WOGS with feathers. Wings with feathers is shown to give a more detailed % than lumping two wings with a single WOG.

What is claimed is:

1. A feather removing apparatus for removing feathers from a poultry carcass comprising:
    a poultry conveyor line having a shackle line chain operable to convey a plurality of shackles hanging therefrom alone a conveyance path and said conveyor line having a 90° bend just piror to a pinch roller mounted adjacent said conveyor line;

a corner sprocket wheel positioned at the 90° bend of the conveyor line, and said corner sprocket wheel operatively connected to said line chain for effecting rotation of said corner sprocket and having at least one rod perpendicularly extending from a side of the sprocket wheel;

an upper and a lower sprocket wheel having the rod perpendicularly extending therethrough and attached alone the perpendicularly extending rod for transferring rotation from the corner sprocket to the upper and lower sprocket wheels and said upper and lower sprocket wheels having a plurality of notches about their circumference and said upper and lower sprocket wheels positioned alona the perpendicularly extending rod for receiving therein the plurality of shackles, tilting and turning said shackles; and said pinch roller having a pair of adjacent roller elements and operably connected to a drive for effecting mutually opposite rotation of the roller elements and said pinch roller adapted to be mounted along and adjacent a the poultry conveyor line;

a first and second elongated wing guide rod immediately adjacent one another and each having a first portion with a length extending substantially parallel to one another and mounted proximately adjacent said pinch roller and said first and second wing guide each having a second portion extending beyond the length of said pinch rollers where the segments second portions angle away from one another for receiving between said first and second guides an oncoming wing of a poultry carcass being conveyed on the conveyor line for presentation of a wing tip to the pinch roller.

2. The feather removing apparatus for claim 1 where the first and second elongated guide rods further comprising:

a plurality of coincident lateral bends with respect to the pinch roller dividing the guide rods into segments having varying lateral angles with respect to the pinch roller for multiple presentation of a wing tip to the pinch roller.

3. The feather removing apparatus as recited in claim 1 where at least one of the wing guide rods is spring mounted for allowing the at least one guide rod to expand away from the other guide rod when receiving an oncoming wing.

4. The apparatus of claim 1 where the notches of the upper sprocket wheel are circular.

5. The apparatus of claim 1 where the notches of the lower sprocket wheel have at least one flattened side.

* * * * *